United States Patent [19]

Dailey et al.

[11] 4,415,825
[45] Nov. 15, 1983

[54] END TURN BRACING WITH LOCKING AND ALIGNMENT DEVICE

[75] Inventors: George F. Dailey, Plum Borough; Charles E. Kauric, Manor Borough, both of Pa.

[73] Assignee: Westinghouse Electric Corp., Pittsburgh, Pa.

[21] Appl. No.: 343,074

[22] Filed: Jan. 27, 1982

[51] Int. Cl.³ .................................................. H02K 3/46
[52] U.S. Cl. ................................... 310/270; 310/260; 403/23; 403/405
[58] Field of Search ............... 310/260, 270; 336/197; 174/138 E; 403/405, 408, 288, 23

[56] References Cited

U.S. PATENT DOCUMENTS

| | | | |
|---|---|---|---|
| 1,238,280 | 8/1917 | Field | 310/270 X |
| 4,072,873 | 2/1978 | Nottingham | 310/260 X |
| 4,238,339 | 12/1980 | Khutoretsky et al. | 310/260 |
| 4,379,243 | 4/1983 | Dailey et al. | 310/260 |
| 4,387,317 | 6/1983 | Alkire et al. | 310/260 |

*Primary Examiner*—Mark O. Budd
*Attorney, Agent, or Firm*—William D. Lanyi

[57] ABSTRACT

A clamping mechanism for the end turns of a dynamoelectric machine is disclosed which permits periodic retightening and provides a means for compensating for misalignment of the clamping components. Annular spacers are provided, each of which have two nonparallel planar surfaces. When two of these spacers are combined in a coplanar association, they can be rotationally positioned relative to each other to provide spatial compensation between a nut and a clamping surface which is nonperpendicular to the threaded bar with which the nut is in threaded communication. The nut and spacers are fixed to the threaded bar with a covering of thermal setting tape to prevent relative movement and possible unthreading.

14 Claims, 3 Drawing Figures

END TURN BRACING WITH LOCKING AND ALIGNMENT DEVICE

BACKGROUND OF THE INVENTION

The present invention relates generally to an end turn bracing apparatus and, more particularly, to a bracing device which provides a means for correcting misalignment which permits the apparatus to be periodically retightened.

Many dynamoelectric machines utilize a stator coil configuration comprising two coaxial groups of conductors with each stator slot having an inner and an outer coil disposed therein. These two cylindrical associations typically extend axially outward from each end of the dynamoelectric machine and radially outward from its central axis. This formation results in an end turn configuration which comprises two coaxial conical coil associations in which the inner and outer coil groups diverge as they progress axially from the stator structure.

The end turn region of a stator coil is subjected to potentially severe vibrations due to its cantilevered configuration and the rotation of the rotor of the dynamoelectric machine and its resulting rotating magnetic field. Many bracing schemes have been tried in the past. For example, U.S. Pat. No. 3,344,296 issued to Coggeshall et al. on Sept. 26, 1967 uses a tension strap to exert a radially outward force on an inner conical coil configuration in order to provide a bracing system which can withstand the above-mentioned vibrational forces. Similarly, U.S. Pat. No. 2,994,735 issued to Marshall et al. on Aug. 1, 1961 lashes the end turns to hoop-like binding bands with a plurality of ties which prevent movement of the individual end turn conductors.

In U.S. Pat. No. 3,344,297 issued to Bishop et al. on Sept. 26, 1967, a J-shaped bar is shown being disposed around the radially inward surface of a ring and passing radially outward between an end turn configuration to be connected to an axial support member by means of a bolted connection. In a somewhat similar disposition, a band is utilized to provide a radially outward force on conical end turns in U.S. Pat. No. 3,949,257 issued to Cooper et al. on Apr. 6, 1976.

Many techniques are available to restrain the movement of the end turn region of stator coils which include providing either a radially outward force on the end turns or a compressing force which pulls the inner and outer conical end turn arrays together. Other examples of these methods are disclosed and described in U.S. Pat. No. 1,238,280 issued to Field on Aug. 28, 1917; U.S. Pat. No. 3,348,085 issued to Coggeshall et al. on Oct. 17, 1967; U.S. Pat. No. 3,089,048 issued to Bahn et al. on May 7, 1963 and U.S. Pat. No. 4,126,799 issued to Iogansen et al. on Nov. 21, 1978.

For every one of the above-mentioned inventions, the existence of material creep is disadvantageous to the primary function of the coil fastener which is to provide a continuous force on the stator's end turns. Therefore, it is beneficial to have the capability of periodically retightening the device used to provide the function.

Furthermore, if the two opposing surfaces against which the clamping force is exerted are not parallel to each other, a rigid clamping device will be subjected to lateral forces which can damage it or reduce its effectiveness. For example, if a threaded stud is used and it is not perpendicular to the surface to be clamped, bending movements will be created when a nut is tightened against the misaligned pressure surface.

The primary object of the present invention is to provide an end turn bracing device which permits periodic retightening and provides a means for alignment of the device to compensate for nonperpendicularity between the bolted surface and the device.

SUMMARY OF THE INVENTION

The present invention relates to an end turn bracing device which provides compensation for misalignment of the device relative to the coils to be braced.

In order to provide a compression force between two coaxial conical arrays of end turns, a generally rigid threaded bar is disposed generally radially through both the inner and outer conical end turn configurations. The bar passes through holes in two rings, one disposed radially inward from the inner coils and one disposed radially outward from the outer coils. Each end of the bar is provided with a threaded portion suitable for association with a nut.

At each end of the bar, between the nut and the respective ring, two spacers are provided. Each spacer is generally annular in shape and has two nonparallel planar surfaces with a central hole therethrough. Each pair of spacers is disposed between a ring and a nut with the threaded bar passing through the hole of each spacer. Each spacer has one of its nonparallel surfaces in coplanar contact with a planar surface of its associated spacer. Each pair of spacers in this configuration has two internal planar surfaces in contact with each other and two external planar surfaces. By rotating one of the two associated spacers relative to the other, the relative angle of the two external planar surfaces can be precisely selected. Since one of these external planar surfaces is adjacent to a surface of a ring and the other is proximate a nut, any nonparallelism between these two compoents can be compensated for by adjusting the relative rotational position of these two spacers about their coaxial holes. By providing this spatial compensation, lateral forces and their resulting moments on the threaded bar can be minimized.

The present invention provides a means for retightening the clamping apparatus periodically. As described above, the existence of material creep tends to loosen conventional clamping devices during use. Prior to the present invention, clamping devices utilized pins to lock the position of nuts. When insulation shrinks, causing the clamping device to loosen, the pins were drilled out and new ones were inserted after the nut was retightened. Since these pins were inserted through the nut in a direction perpendicular to the stud's center line, the pin extended into the stud's threaded surface. Also, when epoxy is used to bond the pin in position, it can migrate into the threaded area and cause galling when the nut is later retightened. The present invention eliminates this problem by using thermal setting tape to wrap the nut, spacers and stud at one end of the threaded bar. This tape hardens to provide a positive locking mechanism, but is removable to provide for later periodic retightening. Since the stud of the present invention generally has two threaded ends, one nut can be pinned and one nut can be fastened with thermal setting tape since retightening only requires the removal of one nut locking device.

When a locking pin is used, a hole is drilled through a planar surface of the nut, parallel to the stud's center line. The pin is inserted through the nut and spacers and into the ring. Although this pin need not be removed in order to retighten the bracing system, its removal could be accomplished without damaging the stud's threads and, since the threads are not affected, locking resin will not migrate into the threaded interface between the nut and the stud.

It should be apparent that the present invention provides an end turn bracing system which facilitates periodic retightening and provides a means for alignment of the device by spatially compensating for nonparallelism between the nut and the bolted surface.

BRIEF DESCRIPTION OF THE DRAWING

The present invention will be more clearly understood by reading the description of the preferred embodiment in conjunction with the figures, in which.

DESCRIPTION OF THE PREFERRED EMBODIMENT

The present invention relates to a bracing system for the end turns of a dynamoelectric machine and, more specifically, to a clamping device which can be periodically retightened and which provides a means for aligning the device in a way which minimizes disadvantageous forces.

Figure 1:
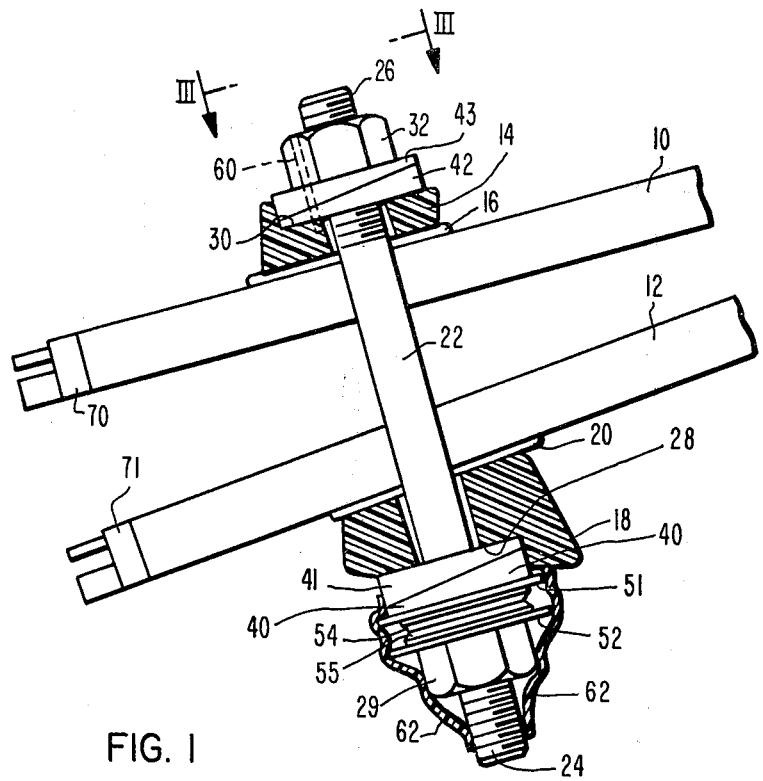
FIG. 1 shows the bracing apparatus of the present invention applied to an end turn configuration.

FIG. 1 illustrates the present invention in an application with an electric generator's end turns. The end turns comprise an inner 10 and an outer 12 conductor that extend axially from a generator stator. Each of the inner conductors 10 is associated with other inner conductors in a conical array and each outer conductor 12 is associated with other outer conductors in a conical array. These arrays form two coaxial and concentric conical arrays which are also generally coaxial with the stator and extend axially therefrom.

An inner ring 14 is disposed radially inward from the inner conductor 10 with a comformable pad 16 between the inner ring 14 and the inner conductor 10. An outer ring 18 is disposed radially outward from the outer conductor 12 with a comformable pad 20 between the outer ring 18 and the outer conductor 12. Both the inner 14 and outer 18 rings have a generally radial hole which is shaped to receive a cylindrical bar 22. The bar 22 has first 24 and second 26 threaded ends which extend radially through the outer 18 and inner 14 rings, respectively.

The outer ring 18 is provided with a generally flat pressure surface 28 against which a first nut 29 can exert a clamping force. Similarly, the inner ring 14 is provided with a generally flat pressure surface 30 against which a second nut 32 can exert a clamping force. It should be apparent that nuts 29 and 32 can be tightened to exert a force on their respective rings which would pull the inner 10 and outer 12 conductors toward each other and exert a tensile force on the bar 22. However, it should also be apparent that if either of the generally flat pressure surfaces, 28 or 30, are not perpendicular to the cylindrical bar 20, lateral forces will be created which would tend to bend the bar 22 and introduce disadvantageous stresses.

In order to prevent these lateral forces, four annular spacers 40, 41, 42 and 43 are provided. Each spacer has two nonparallel planar surfaces with a central hole therethrough. The spacers are grouped in pairs and one pair is disposed around each end of the bar. The first 40 and second 41 spacers are positioned radially outward from the outer ring 18 and the third 42 and fourth 43 spacers are positioned radially inward from the inner ring 14.

Locking momentarily at the first 40 and second 41 annular spacers, it should be apparent that they can provide spatial compensation between the generally flat surface 28 and a planar pressure surface of the first nut 29. By rotating one spacer in relation to the other, their external planar surfaces can be adjusted to form a preselected angle therebetween. This characteristic provides for proper alignment of the bar 22 in relation to the first nut 29 and will be described in greater detail below. Similarly, the third 42 and fourth 43 spacers can be rotated to align the ring 14 with the bar 22. Without this spatial compensation, it should be apparent that, when the nuts 29 and 32 are tightened, they can encounter pressure surfaces which are not parallel to their planar surfaces and therefore exert lateral forces on the bar 22.

Also in FIG. 1, two washers 51 and 52 are shown positioned on both sides of two Belleville washers 54 and 55. When the nuts 29 and 32 are tightened, the Belleville washers exert a force which tends to maintain a tensile force on the bar 22. If the components of the present invention or any part of the end turn assembly shrinks due to creep in a way that would tend to loosen the clamping device, the resiliency of the Belleville washers can correct for this and maintain a tensile force on the bar 22.

In order to prevent the second nut 32 from moving in relation to the inner ring 14, a pin 60 is inserted into a hole drilled through the second nut 32, the third 42 and fourth 43 spacers and the inner ring 14. The pin 60 extends parallel to the center line of the bar 22 without affecting the threaded end 26 of the bar 22.

The first nut 29 is fixed in relation to the first threaded end 24 of the bar with a hardenable fabric 62 which can be a thermal setting tape. This fabric 62 can be removed in the event that the clamping device requires retightening. With the fabric 62 removed, the first nut 29 can be tightened and a new fabric 62 can be placed around the first nut 29, spacers 40 and 42 and the first threaded end 24 of the bar 22.

It should be understood that, although the inner 10 and outer 12 conductors are shown in FIG. 1 with fluid connectors 70 and 71, these are not directly related to the present invention. Any type of stator conductor system using inner and outer end turn arrays as described above can be clamped with the present invention.

Figure 2:
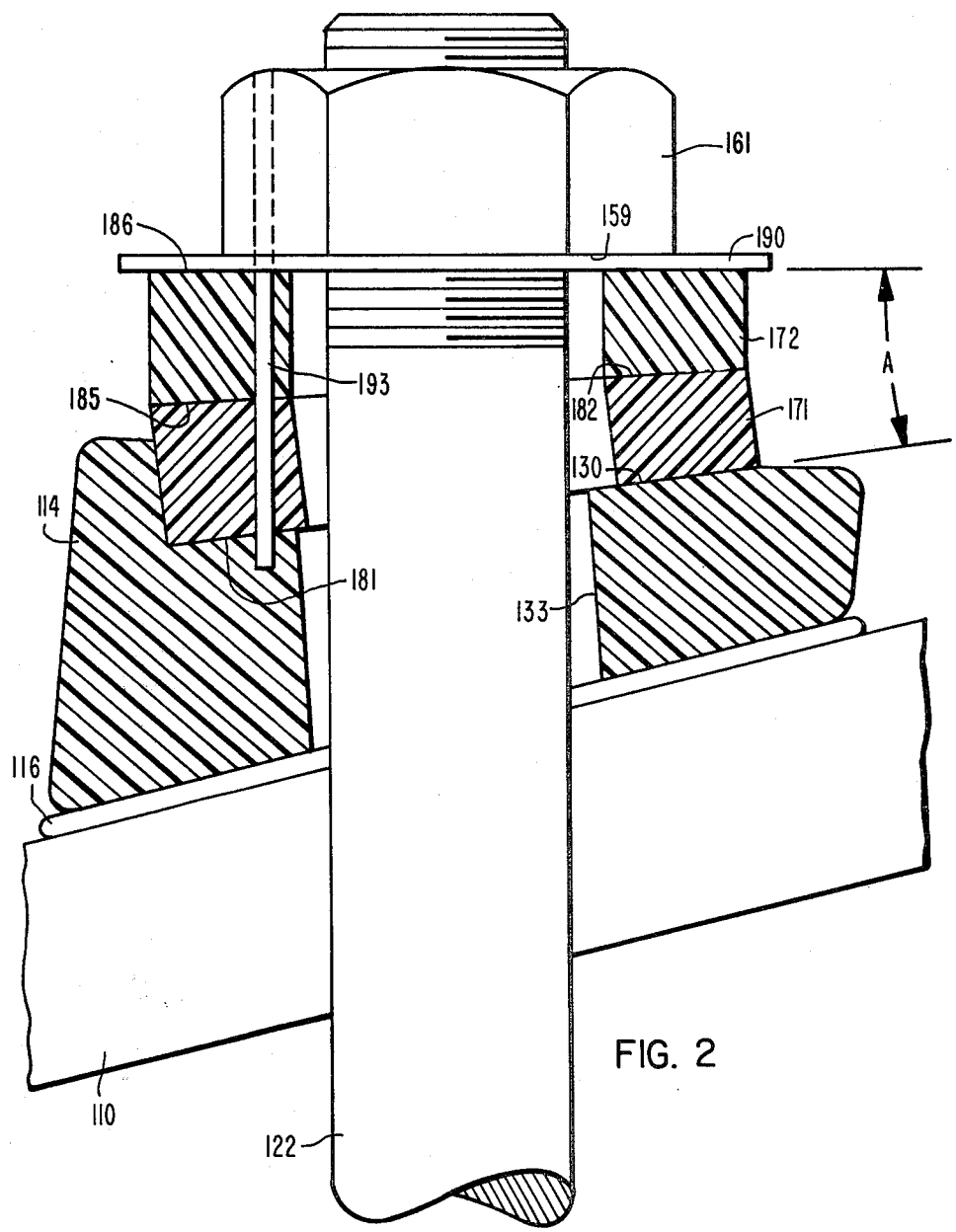
FIG. 2 illustrates the spatial compensation capabilities of the present invention.

FIG. 2 illustrates the spatial compensation characteristics of the present invention. It depicts an exemplary configuration in which the annular spacers of the present invention can compensate for misalignment between a threaded bar (e.g. reference numeral 22 of FIG. 1) and the radial hole through the inner or outer ring described above. This misalignment can result in a nonparallelism between the generally flat surface of the ring and the planar surface of the nut.

In FIG. 2, a threaded bar 122 is shown in relation to an object 110 which is to be clamped. This object 110 is analogous to the inner or outer conductor (reference numerals 10 or 12 of FIG. 1) described above. Adjacent to this object 110 is a ring 114 with a conformable pad 116 placed between the ring and the object 110 to be clamped. These components are analogous to the ring and pad (reference numerals 14 and 16 of FIG. 1) discussed above. It should be understood that, while pads (reference numerals 16 and 20 in FIG. 1 and reference numeral 116 in FIG. 2) and are shown being disposed proximate the rings, they are not a requirement of the present invention and serve only to provide a comformable interface between their adjacent components.

The ring 114 is provided with a generally flat surface 130 which is generally perpendicular to a hole 133 which extends generally radially through the ring 114. Under ideal conditions, the bar 122 and the hole 133 will be coaxial, resulting in the generally flat surface 130 being parallel to a planar surface 159 of nut 161 which is in threaded association with the bar 122. However, under typical operating conditions, the bar 122 and the hole 133 are not perfectly coaxial and, therefore, the planar surface 159 of the nut 161 is not perfectly parallel to the generally flat surface 130 of the ring 114. As described above, this misalignment can cause lateral forces on the bar 122 when the nut 161 is tightened.

To compensate for this potential misalignment, the present invention utilizes a pair of annularly shaped spacers 171 and 172. Each of these spacers has two non-parallel planar surfaces. Spacer 171 has nonparallel planar surfaces 181 and 182 and spacer 172 has nonparallel planar surfaces 185 and 186. It should be apparent that by rotating the spacers 171 and 172 around the bar 122 in relation to one another, the angular relationship of the two external planar surfaces 181 and 186, which is shown as angle A in FIG. 2, is changed. By doing this, planar surfaces 182 and 185 slide upon one another while planar surface 181 remains coplanar with the generally flat surface 130 of the ring 114. The two spacers can therefore be positioned relative to each other to result in planar surface 186 being perpendicular to the bar 122. Thus, when nut 161 is tightened, its planar pressure surface 159 will be parallel to the planar surface 186 of the spacer 172 which is most proximate the lateral forces will be minimized.

In FIG. 2, a washer 190 is shown between the nut 161 and the most proximate spacer 172, but it should be understood that the washer 190 is not a requirement of the present invention. After the two spacers 171 and 172 are rotated to provide the proper preselected angle A, they can be bonded together at their coplanar surfaces 182 and 185, respectively. Also, spacer 171 can be similarly bonded to the ring 141 along their coplanar surfaces 181 and 130, respectively. With the first 171 and second 172 spacers and the ring 114 bonded together, it should be noted that a single, generally rigid member is formed which provides a planar surface 186 which is perpendicular to the bar 122. This perpendicularity provides for minimized lateral forces on the bar 122 when the nut 161 is tightened against the spacers or, in this particular example, the washer 190.

It should also be apparent that the configuration of the spacers, as shown in FIG. 2, can be used in conjunction with other components such as Belleville washers (not shown in FIG. 2). When Belleville washers are used for the purpose of maintaining an expansive force between the nut 161 and the spacers 171 and 172, they can most advantageously be placed between two washers and between the nut 161 and the spacer 172.

In order to prevent the nut 161 from moving in relation to the spacers 171 and 172 or the ring 114, a pin can be inserted into a predrilled hole through these components. If the pin is inserted in a direction parallel to the center line of the bar, the nut 161 can be effectively locked to the ring 14 without permanent effect on the threads of the bar 122.

Figure 3:
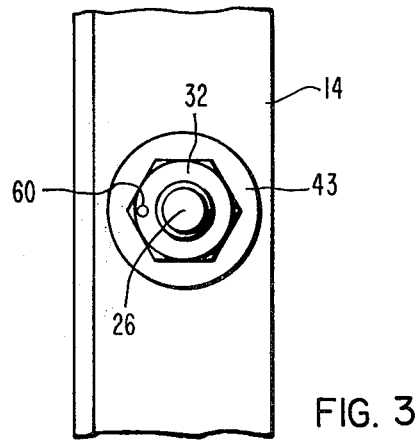
FIG. 3 is a detail view of FIG. 1 that depicts the locking pin of the present invention.

FIG. 3 is a detail view of the configuration of the present invention shown in FIG. 1 and discussed above. FIG. 3 shows the ring 14 with the spacer 43 and nut 32 which is in threaded association with a threaded end 26 of the bar (reference numeral 22 of FIG. 1). Also shown is the pin 60 which extends through the spacer 43, nut 32, ring 14 and spacer 44 (not visible in FIG. 3, but shown in FIG. 1). The pin 60 is most advantageously located at a corner of the nut 32 which is closest to the center line of the ring 14, but other suitable locations are possible within the scope of the present invention.

It should be apparent that the present invention provides a clamping mechanism that can be easily retightened without incurring damage to the threaded members and which provides a means for spatially compensating for misalignment of the clamping components. Furthermore, it should be understood that, although the preferred embodiment has been described with considerable particularity, other embodiments are possible within the scope of the invention. Specifically, it should be apparent that the alignment and locking components of the present invention can be utilized at one end of a rigid stud while other suitable fastening methods can be used at the studs distal end.

What we claim is:

1. A fastening device for securing end turns of an electric generator, comprising:
    a cylindrical rod threaded at at least one end;
    two annular spacers, each of said spacers having two nonparallel planar surfaces with a central hole therethrough, said annular spacers being arranged in a coplanar association with said cylindrical rod extending through the holes of said spacers;
    a member with a generally flat surface, said member being disposed in coplanar association with a first external planar surface of one of said two associated annular spacers;
    an annular member having a central bore therethrough, said bore being threaded,
    said annular member being in threaded association with a threaded end of said cylindrical member, said annular member having a planar surface in coplanar association with a second external planar surface of one of said two associated annular spacers; and
    whereby said annular threaded member exerts a force on said second external planar surface and said generally flat surface of said member exerts a force on said first external planar surface, said two annular spacers being compressed between said annular member and said generally flat surface of said member, said two annular spacers being rotatable about said cylindrical member.

2. The device of claim 1, whereby:
    said cylindrical rod is a threaded stud.

3. The device of claim 1, whereby:
    said annular member is a threaded nut.

4. The device of claim 1, further comprising:
    a thermal setting tape disposed around said spacers, said annular threaded member and said cylindrical rod, said tape fixing the relative position of said annular threaded member and said cylindrical rod.

5. A fastening apparatus capable of being retightened after use, said apparatus comprising:

a cylindrical rod having a first and a second end, said first and second ends being threaded;

a first spacer having first and second nonparallel planar surfaces with a hole therethrough;

a second spacer having first and second nonparallel planar surfaces with a hole therethrough, said first and second spacers being disposed in a coplanar association, said first surface of said first spacer being adjacent to said first surface of said second spacer, said cylindrical rod extending through the holes of said first and second spacers;

means for holding said second end of said cylindrical rod in a fixed position;

a nut in threaded association with said first end of said cylindrical rod, said nut being positioned to exert a force against said second planar surface of said first spacer in a direction toward said holding means; and whereby the angular relationship between said second planar surface of said first spacer and said second planar surface of said second spacer is determinable from the relative angular positions of said first and second spacers.

6. The apparatus of claim 5, further comprising:

a pin disposed through a planar surface of said nut and said second planar surface of said first spacer, said pin extending through said second planar surface of said second spacer and into a stationary object which is adjacent said second planar surface of said second spacer.

7. The apparatus of claim 5, further comprising:

a hardenable fabric disposed around said nut, said first and second spacers and said cylindrical rod in a relative motion restricting association.

8. An end turn bracing apparatus, comprising:

an inner ring disposed radially inward from and adjacent to a conical association of inner coils;

an outer ring disposed radially outward from and adjacent to a conical association of outer coils, said inner and outer coils being disposed in a coaxial association;

a cylindrical rod extending radially through said inner and outer rings, said rod having a first and a second threaded end, said first threaded end extending radially inward from said inner ring and said second threaded end extending radially outward from said outer ring;

a first spacer having two nonparallel planar surfaces with a hole therethrough;

a second spacer having two nonparallel planar surfaces with a hole therethrough;

said first and second spacers being disposed in a coplanar association, said first end of said threaded bar extending through said holes in said first and second spacers, said first and second spacer being disposed radially inward from said inner ring;

a first nut disposed in threaded association with said first end of said threaded bar radially inward from said association of first and second spacers;

a third spacer having two nonparallel planar surfaces with a hole therethrough;

a fourth spacer having two nonparallel planar surfaces with a hole therethrough;

said third and fourth spacers being disposed in a coplanar association, said second end of said threaded bar extending through said holes in said third and fourth spacers, said third and fourth spacers being disposed radially outward from said outer ring;

a second nut disposed in threaded association with said second end of said threaded bar radially outward from said association of third and fourth spacers;

a first means for preventing relative motion between said first nut and said inner ring;

a second means for preventing relative motion between said second nut and said outer ring;

resilient means for maintaining a force on said second nut, said force being axial to said threaded bar and in the direction away from said first nut;

said first and second spacer being rotatable relative to each other during assembly in a manner which provides spatial compensation for nonperpendicularity between the radially outward surface of said outer ring and the central axis of said threaded bar.

9. The apparatus of claim 8, wherein:

said first preventing means is a pin disposed in a hole extending through said first nut and said inner ring, said hole being parallel to the center line of said thread bar.

10. The apparatus of claim 8, wherein:

said second preventing means is a hardenable fabric disposed around said second nut and said second end of said threshold bar.

11. The apparatus of claim 8, wherein:

said resilient mounting means comprises a Belleville washer.

12. A clamping device for securing end turns of an electric generator:

a cylindrical bar having first and a second threaded ends, said bar being disposed with said first end extending radially outward from said end turns and said second end extending radially inward from said end turns;

an inner ring disposed radially inward from said end turns, said inner ring having a generally radial hole with said second end of said bar extending therethrough;

a first generally flat surface of said inner ring proximate said hole and on the radially inner surface of said inner ring;

a first and a second annular spacers, each of said spacers having two nonparallel planar surfaces with a central hole therethrough, said spacers each being disposed around said bar radially inward from said inner ring;

a first nut in threaded association with said second threaded end of said bar, said first and second spacers being rotated to provide spatial compensation between said first generally flat surface and a planar surface of said nut;

a first pin disposed in a hole that extends through said first nut, said first and second spacers and said inner ring, said hole being generally parallel to the center line of said bar;

an outer ring disposed radially outward from said end turns, said outer ring having a second generally flat surface on its radially outer surface with a radial hole therethrough;

a third and fourth annular spacers, each of said third and fourth spacers having two nonparallel planar surfaces with a hole through which said first threaded end of said bar is extended;

a second nut disposed in threaded association with said first threaded end of said bar, said second nut being radially outward from said third and fourth spacers, said third and fourth spacers being rotatable around said bar to provide spatial compensation for nonparallelism between said second generally flat surface and a planar surface of said second nut;

resilient means for maintaining a force between said second generally flat surface and said second nut, said maintaining means being disposed between said second nut and said third and fourth spacers; and a hardenable fabric disposed around said second nut and said first threaded end of said bar, said fabric preventing motion of said second nut relative to said first threaded end of said bar.

13. The device of claim 12, wherein:

said maintaining means is a Belleville washer.

14. The device of claim 12, wherein:

said hardenable fabric is a thermal setting tape.

* * * * *